United States Patent [19]
Goss

[11] Patent Number: 5,407,311
[45] Date of Patent: Apr. 18, 1995

[54] ULTRASONIC STUD AND METHOD OF ASSEMBLY

[75] Inventor: David C. Goss, Rockford, Ill.

[73] Assignee: Textron Inc., Providence, R.I.

[21] Appl. No.: 105,345

[22] Filed: Aug. 9, 1993

[51] Int. Cl.$^6$ .............. F16B 37/06; F16B 39/00; F16B 39/02; B21B 39/00

[52] U.S. Cl. .............. 411/171; 411/82; 411/107; 411/180; 411/930; 403/282; 29/517

[58] Field of Search ........... 411/82, 107, 171, 180, 411/84, 85, 930; 403/274, 278, 279, 282; 20/505, 509, 514, 517; 156/73.1; 228/1.1

[56] References Cited

U.S. PATENT DOCUMENTS

| | | | |
|---|---|---|---|
| 3,189,672 | 6/1965 | Lyman, Jr. | 29/517 X |
| 4,850,772 | 7/1989 | Jenkins | 411/171 |
| 4,941,788 | 7/1990 | HighField | 411/180 |
| 5,046,243 | 9/1991 | Walker | 29/509 X |
| 5,199,837 | 4/1993 | Goss | 411/107 |
| 5,222,850 | 6/1993 | Medal | 411/180 X |

OTHER PUBLICATIONS

P.S.M. Fasteners (17 pages).
Forward Technologies Industries, Inc. Plastic Bonding Equipment (32 pages).
Black & Decker Helicoil Catalog, 1989 (24 pages).

*Primary Examiner*—Neill R. Wilson
*Attorney, Agent, or Firm*—Bushnell, Giangiorgi & Blackstone, Ltd.

[57] ABSTRACT

A system for inserting and retaining a fastener between two generally parallel spaced apart webs formed on a first workpiece. The fastener is inserted using ultrasonic energy to deform the material of the webs to engage an axial force resisting portion and a torsional force resisting portion of the fastener with the material of the webs. The present invention includes the fastener which is constructed for use in the system, as well as an article employing the fastener for attaching the first workpiece, to which the fastener is attached, to a second workpiece.

15 Claims, 3 Drawing Sheets

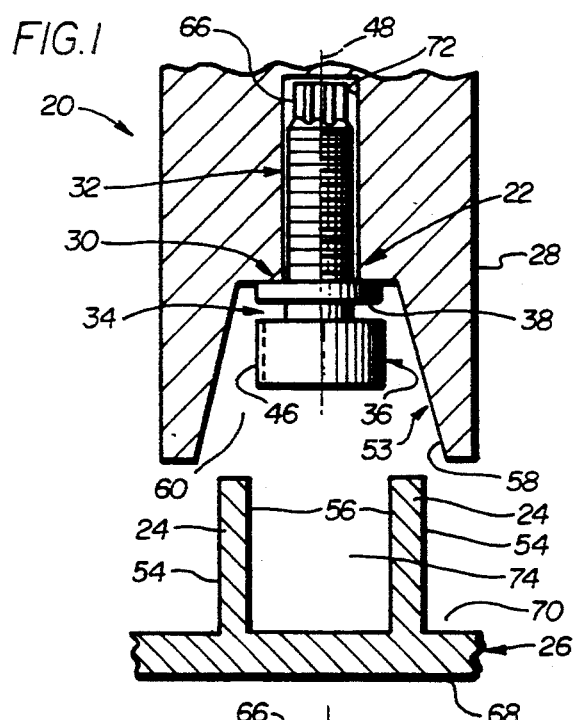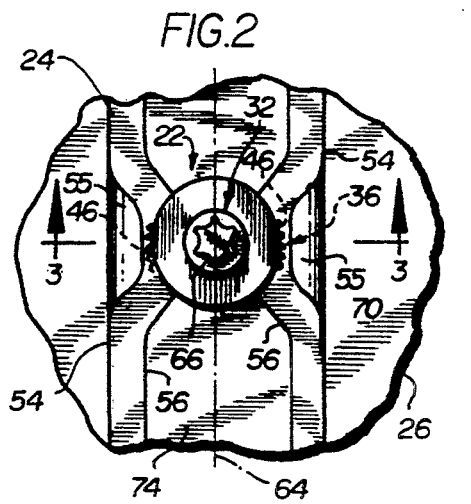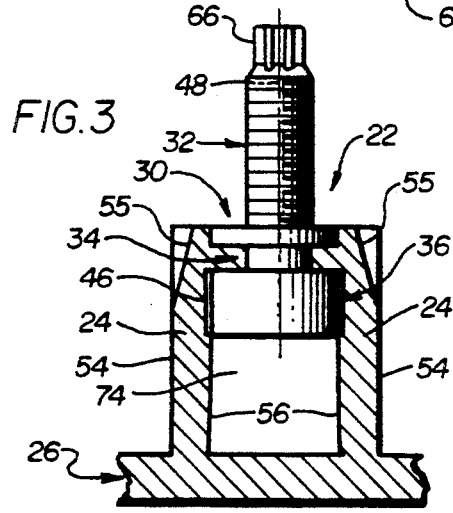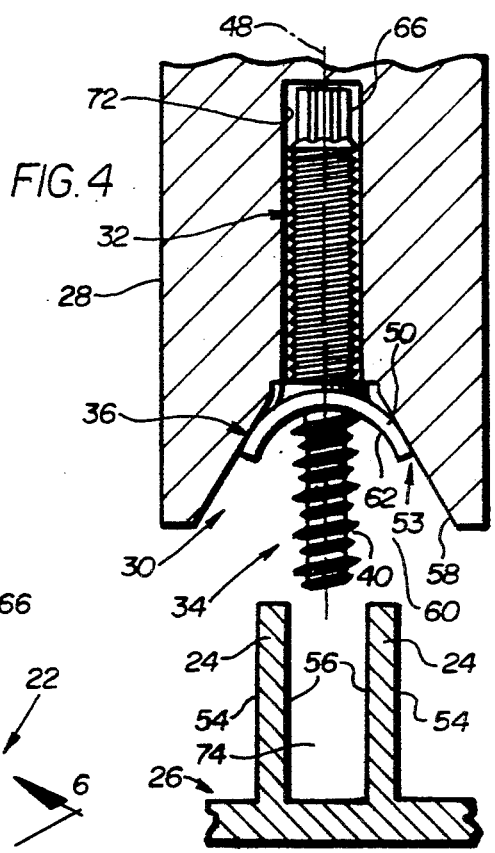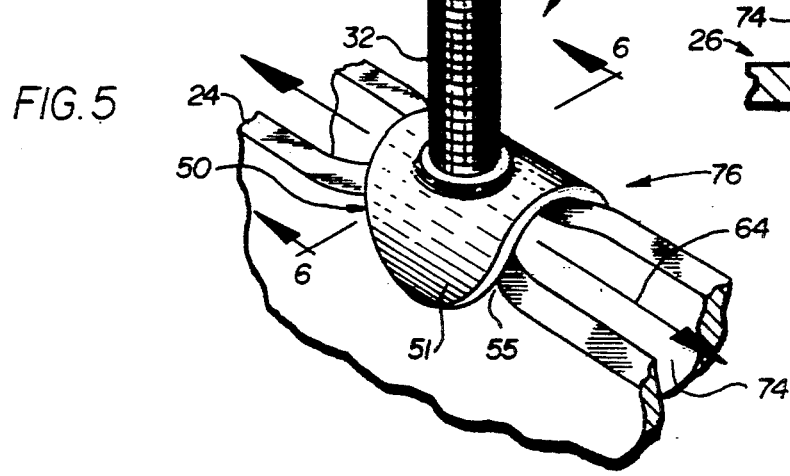

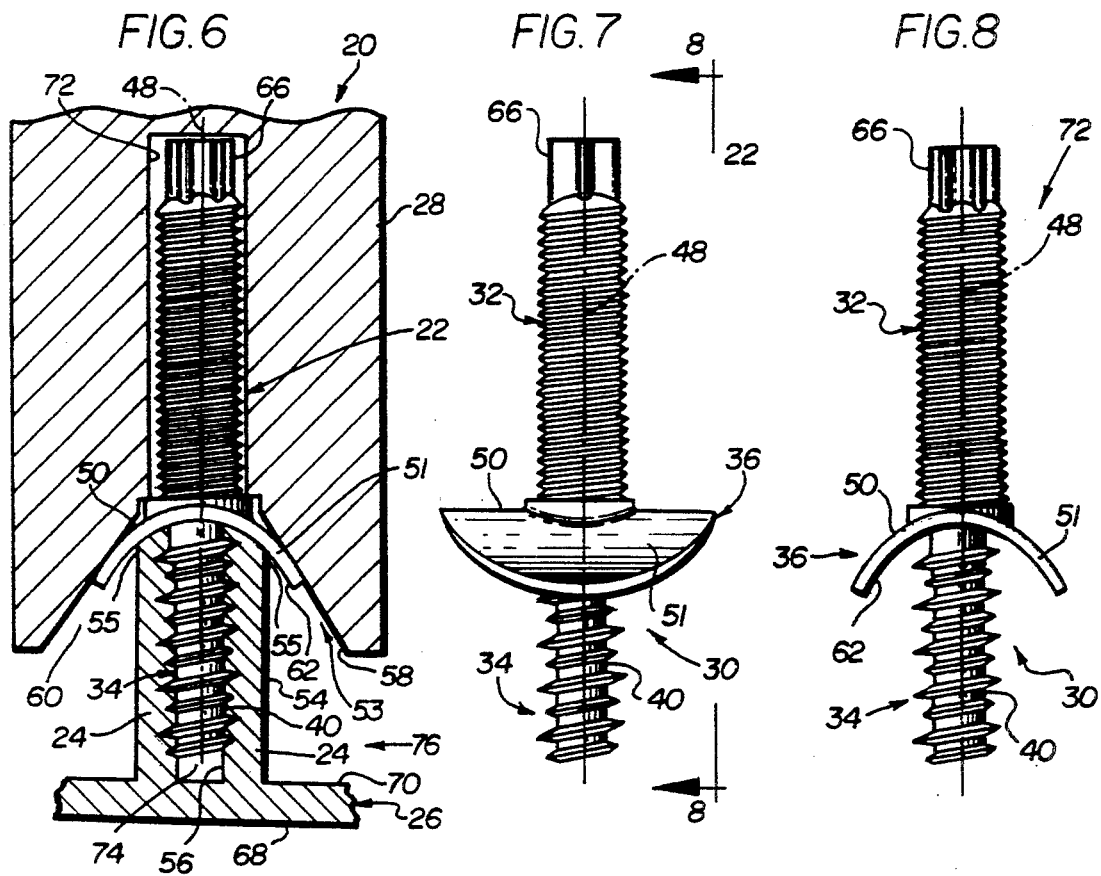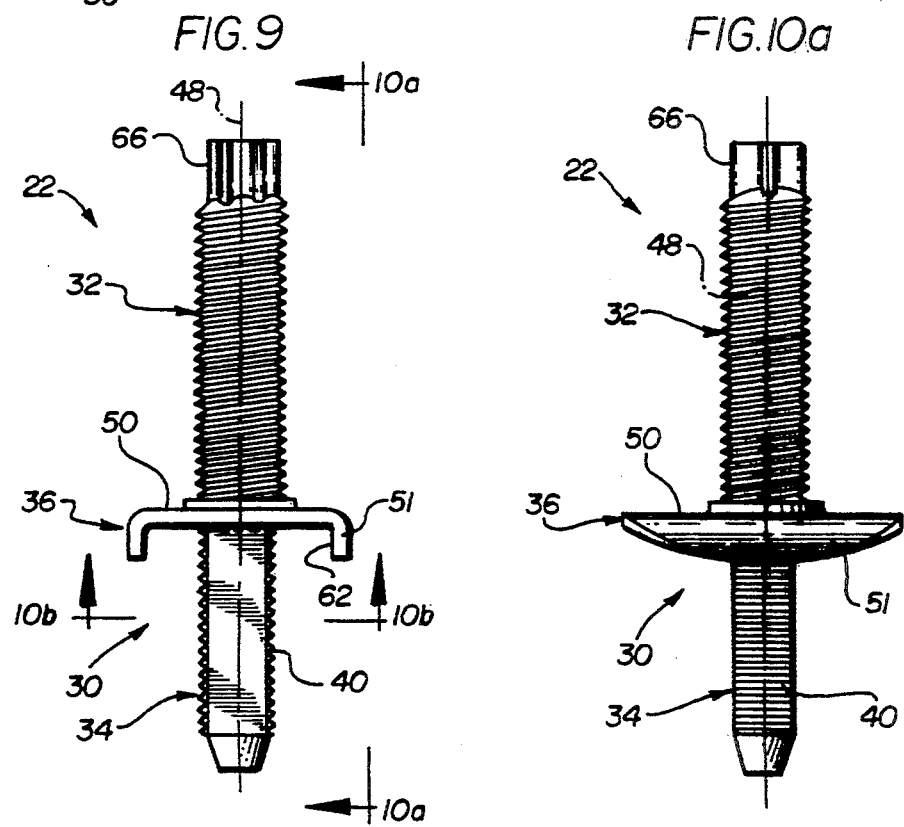

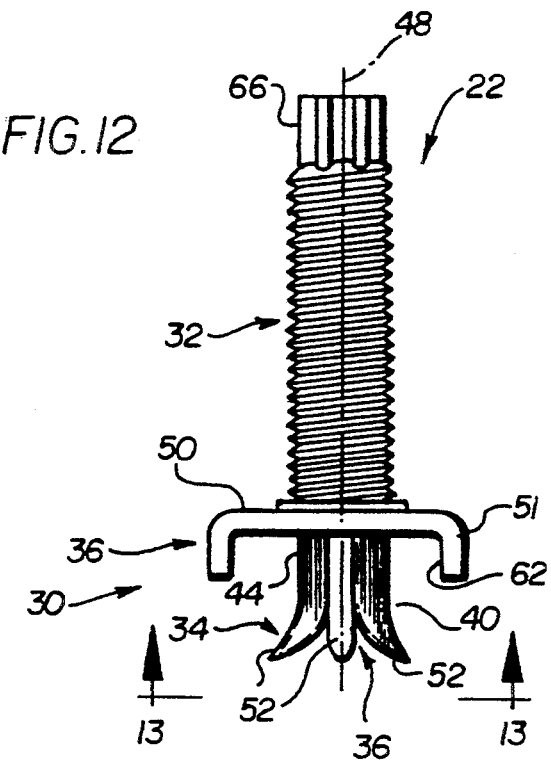
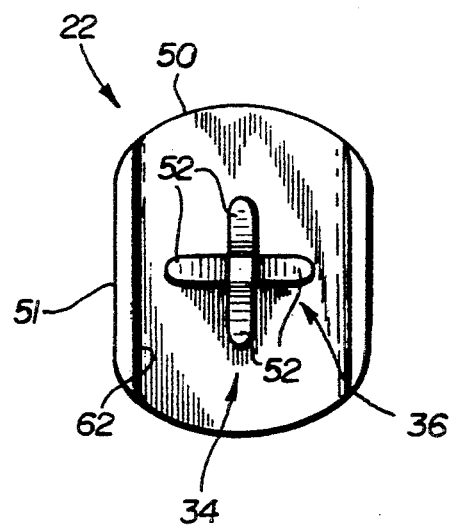
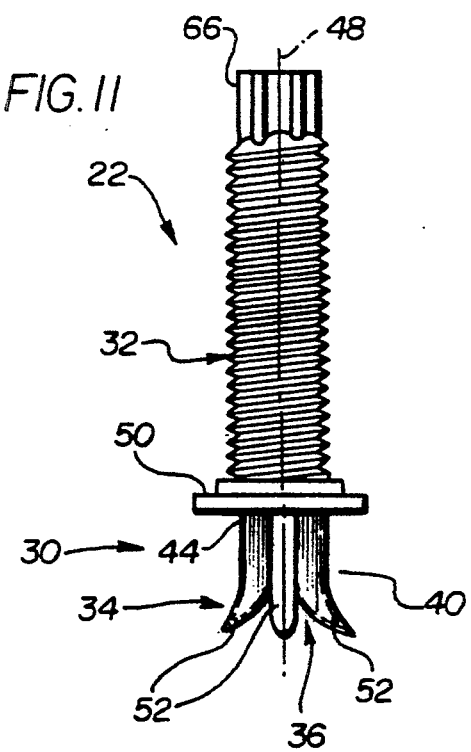
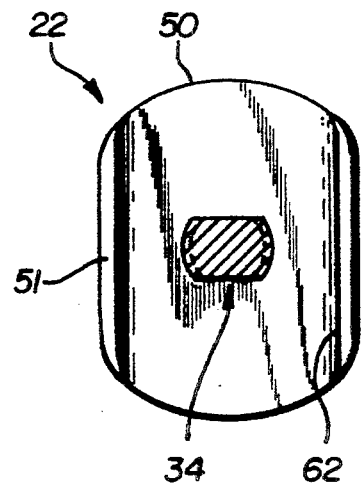

5,407,311

ULTRASONIC STUD AND METHOD OF ASSEMBLY

BACKGROUND OF THE INVENTION

The present invention generally relates to a system for retaining a stud or fastener in plastic material which prevents shrink voids or depressions in an opposing side of the material. More specifically, the present invention relates to fasteners, fastener systems, and an article incorporating a fastener which employing ultrasonic insertion techniques to insert the fastener into a piece of material without creating cosmetic defects in the material.

Many fastener systems, fasteners, and methods of inserting fasteners into material have been devised. More particularly, ultrasonic energy generating and directing devices are used to insert fasteners into material by deforming the material of the workpiece around an insertion end of the fastener under the influence of ultrasonic energy. Retention of a fastener in a first workpiece is achieved by providing threads on the fastener such that the material of the workpiece is deformed into thread roots on the fastener. The result of such an ultrasonically inserted fastener is similar to a threaded fastener which is driven into the material except that the ultrasonic insertion operation does not require molding, forming, or drilling a threaded bore for receiving the threaded portion of the fastener.

It should be clear to one skilled in the art that fasteners or studs can be inserted into a first workpiece by tapping a threaded bore in the workpiece for receiving the fastener. When tapping a bore in a workpiece to receive a threaded fastener, a portion of material must be provided in which to tap the bore. This requirement can become problematic when the workpiece is an item such as a vehicle grill or the like having a thin walled structure. A vehicle grill has flat or curved thin walled surfaces which do not provide sufficient material in which to form a threaded bore. Therefore, in order to provide sufficient material to engage a fastener with such a workpiece, a boss or protruding portion of material extending from the grill must be provided. In this regard, the protrusion extends from an attachment side of the grill and extends into the engine compartment of the vehicle. Similarly, if the first workpiece is other than a vehicle grill, the protrusion is formed on a side of the first workpiece which is not visible when the first workpiece is attached to a second workpiece.

With further reference to the vehicle grill example, the grill has a cosmetic side and an attachment side. The manufacturing requirements of the cosmetic side demand that the surface be free of cosmetic defects which would affect the appearance of the assembled vehicle. This problem is exacerbated since plastic is often used to form such grills, and the plastic material is coated with a chrome cosmetic finish. The chrome finish tends to magnify or accentuate any defects such as scratches, depressions, or bumps.

The production of grills using plastic material and a chrome finish has encountered problems in that a protrusion of sufficient size to securely retain a fastener to attach the grill to the vehicle tends to form cosmetic defects on the cosmetic side of the grill. The cosmetic defects are a result of the forming process used to form the protrusion. Forming a protrusion for attaching a fastener to the attachment side of the grill requires that a pin be provided in the mold to produce the bore in the protrusion. When the mold is separated, and the material has not completely cured, removal of the pin from the protrusion bore tends to pull the cosmetic side inwardly forming a concave depression on the cosmetic side of the grill in the proximity of the protrusion. The concave depression on the cosmetic side is considered a defect and is magnified upon applying the chrome finish to the grill. Additionally, disparities between the wall thickness of the protrusion and the wall thickness of the grill results in sinking as the plastic material hardens. The material shrinkage tends to form shrink voids in the cosmetic side of the grill further exacerbating defects on the cosmetic side of the grill.

One way to overcome the problem of cosmetic defects formed on a grill as a result of the forming process is to provide a bridge structure supporting the protrusion a distance away from the attachment side of the grill. The bridge can be formed using webs of material upon which the protrusion is attached. The resulting structure positions the protrusion away from the grill structure, thereby eliminating the sinking or depression problem on the cosmetic side of the grill structure. The webs used to form the bridge are sufficiently thin to prevent formation of shrink voids on the cosmetic side of the grill.

This solution to the sinking and defect problem is quite costly and inefficient because special molds must be provided with shuttles or sliders to support the bridges and protrusions away from the grill structure. If for some reason the location of the protrusions must be changed, the molds must be reconfigured with new shuttle positions. Additionally, depending on the design of the grill structure, use of shuttles in the mold may be impractical because the shuttles require a clearance distance to operate. Further still, the construction and maintenance of molds having shuttles can be quite time consuming and expensive.

As such, it remains a problem to provide a system for attaching a fastener to a workpiece, such as a vehicle grill, which does not result in defects on a cosmetic side of the grill. Prior to the present invention, no acceptable solution to these problems has been known.

OBJECTS AND SUMMARY OF THE INVENTION

A general object of the present invention is to provide a system for inserting and retaining a fastener in engagement with a workpiece without creating or exacerbating defects on a cosmetic side of the workpiece.

A more specific object of the present invention is to provide a system, fastener, and article which employs ultrasonic energy to insert a fastener into a workpiece to prevent axial pullout and rotary motion of the fastener relative to the workpiece.

A further object of the present invention is to provide a system, fastener, and article which ultrasonically attaches a fastener to a workpiece between two generally parallel webs to prevent rotation and axial pullout, as well as preventing the formation of surface defects on a cosmetic side of the workpiece.

Briefly, and in accordance with the foregoing, the present invention envisions a system for inserting and retaining a fastener between two generally parallel spaced apart webs formed on a first workpiece. The fastener is inserted using ultrasonic energy to deform the material of the webs to engage an axial force resisting portion and a torsional force resisting portion of the fastener with the material of the webs. The present invention includes the fastener which is constructed for use in the system, as well as an article employing the fastener for attaching the first workpiece, to which the fastener is attached, to a second workpiece.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a partial fragmentary, cross-sectional, side elevational view of an ultrasonic fastener insertion system of the present invention showing a fastener positioned in an ultrasonic horn for insertion between two generally parallel spaced apart webs;

FIG. 2 is a top plan view of the fastener as shown in FIG. 1 after being inserted between the two webs;

FIG. 3 is a partial fragmentary, cross-sectional, side elevational view taken along line 3—3 in FIG. 2 showing intimate engagement between a torsional force resisting portion of the fastener, an axial force resisting portion of the fastener and the material of the webs;

FIG. 4 shows a fastener in an ultrasonic horn positioned for engagement between two generally parallel spaced apart webs similar to the illustration as shown in FIG. 1;

FIG. 5 is a perspective view of the fastener as shown in FIG. 4 after the fastener is engaged with the two generally parallel spaced apart webs;

FIG. 6 is a partial fragmentary, cross-sectional, side elevational view taken along line 6—6 in FIG. 5 showing intimate engagement between a torsional force resisting portion of the fastener, an axial force resisting portion of the fastener and the material of the webs;

FIG. 7 is a right side elevational view of the fastener as shown in FIGS. 4-6;

FIG. 8 is a side elevational view taken along line 8—8 in FIG. 7;

FIG. 9 is an embodiment of the fastener as shown in FIGS. 1-8 with slight variations to torsional and axial force resisting portions of the fastener;

FIG. 10a is a side, elevational view taken along line 10a—10a in FIG. 9;

FIG. 10b is a cross-sectional view taken along line 10b–10b in FIG. 9 showing axial force resisting portions and torsional force resisting portions of the fastener;

FIG. 11 is an embodiment of the fastener as shown in FIGS. 11-10b in which the torsional and axial force resisting portions are combined in a unitary structure;

FIG. 12 is an embodiment of the fastener as shown in FIGS. 1-11 in which a torsional force resisting portion as shown in FIGS. 7-10b is included; and FIG. 13 is a bottom plan view taken along line 13—13 in FIG. 12 of the fastener shown in FIG. 12.

DETAILED DESCRIPTION OF THE PREFERRED EMBODIMENT

The drawings show an ultrasonic fastener insertion system 20 of the present invention. The ultrasonic fastener insertion system 20 is shown generally in FIG. 1 with a fastener 22 positioned for engagement between two spaced apart web portions 24,24 formed on a first workpiece 26. An ultrasonic horn 28 is constructed for ultrasonically engaging the fastener 22 with the webs 24,24 of the workpiece 26. The structure and function of the ultrasonic horn 28 is described in greater detail hereinbelow.

The fastener 22 includes a web engaging head 30 and a boss or protrusion 32 formed for engaging a second workpiece (not shown). The web engaging head 30 includes an axial force resisting portion 34 and a torsional force resisting portion 36. The axial force resisting portion 34 prevents the fastener 22 from being pulled out of its engagement with the webs 24,24, and the torsional force resisting portion 36 resists rotation of the fastener 22 mounted between the webs 24,24. As shown in FIGS. 1-3, the axial force resisting portion 34 is configured as an annular groove 38. In FIGS. 4-10b, the axial force resisting portion 34 is shown as a pitched annular groove 40. In FIGS. 11-13, the axial force resisting portion 34 is configured as an annular groove 42 which is defined by the outside surfaces 44 of the web engaging head 30. The torsional force resisting portion 36 is shown in FIGS. 1-3 as ribs 46 which are in a parallel alignment with a central axis 48 of the stud 22. As shown in FIGS. 4-10b and 12, 13, the torsional force resisting portion 36 is configured as a collar 50 having bent wings 51. In FIGS. 11-13, additional torsional force resistance is provided by spaced apart prongs 52. When the web engaging head 30 of the fastener 22 is inserted between the webs 24,24, the torsional force resisting portion 36 intimately engages the webs 24,24.

The system 20 includes at least one energy director or angled segment 53 for directing ultrasonic energy to deform the outside surfaces 54 of the webs 24,24 inwardly. The angled segments 53 form a resulting concave surfaces or crimped areas 55 on the outside surface 54 as shown in FIGS. 2,3,5,6. The crimped areas 55 on the outside surfaces 54 is important to facilitate intimate engagement of a corresponding inside surface 56 of the webs 24,24 with the web engaging head 30. As shown in FIG. 1, the angled segment 53 is configured as the sloped inside surface 58 in a cavity 60 of the ultrasonic horn 28. In FIGS. 4 and 6 the angled segment 53 is configured as the sloped inside surface 58 in the cavity 60 of the ultrasonic horn 28 and further includes a deforming surface 62 defined on an under side of the bent wing 51 of the collar 50.

The ultrasonic horn 28 is formed with the cavity 60 having a generally frustoconical or open cone shape. The ends of the cavity 60 need not be closed as long as sufficient ultrasonic energy is transmitted from the horn 28 to the fastener 22 via the angled segments 53. The sloped inside surface 58 of the ultrasonic horn 60 slopes inwardly away from the a mouth 63. The inside surfaces 58 of the angled segment 53 deform the webs 24 inwardly around the fastener 22 to form the crimped areas 55 under the influence of ultrasonic energy transmitted through the ultrasonic horn 28.

The collar 50 is formed to overlie and engage at least one of the webs to deform the webs 24 to provide intimate engagement between the engaging head 30 and the webs 24. The collar 50 also resists torsional forces applied to the fastener 22 to prevent rotation of the fastener 22 relative to the webs 24,24. With reference to FIG. 5, it can be seen that the bent wings 51 of the angled segments 53 overlying the webs 24 and engaging an outside surface 54 of the web 24 prevent longitudinal displacement of the fastener 22 along a longitudinal axis 64 defined parallel to and extending between the webs 24,24, as well as resisting torsional forces. The bent wings 51 are shown on the fasteners 22 illustrated in FIGS. 4-10b, 12, and 13. The fastener 22 shown in FIGS. 1–3, and 11 requires that the angled segments 53 be disposed on the ultrasonic horn 28 used for inserting the fastener. The ultrasonic horn 28 inwardly deforms the material of the web portions between which the fastener is inserted in the same manner as the deforming surface 62 defined on an under side of the bent wing 51 of the collar 50.

In forming the fastener 22, used in the system 20 of the present invention, appropriate acceptable forming methods such as thread rolling and cold working are used. For example, the web engaging head 30 can be formed by cold rolling threads onto to the outside surface of the fastener 22 and rolling threads onto the protrusion 32. The bent wings 51 on the collar 50 are formed by forming the annular collar 50 about the central axis 48 of the fastener 22 and cold working or bending the radially disposed segments of the collar at a desired angle to form the bent wings 51. During the forming process, a driving head 66 can be formed on the protrusion 32.

When forming the fastener 22 of the present invention as shown in FIGS. 11–13, the protrusion 32 is threaded and the web engaging head 30 is formed by working the shank along the central axis 48 to form the prongs 52. The angled segments 53 of the collar 50 are then bent to form the bent wings 51. As shown in FIGS. 4–10b, the collar 50 is curved as a result of the bending process, whereas in FIGS. 12 and 13, the bent wings 51 are formed at approximately right angles. It should be clear that, based on the teachings of the present invention, a variety of collar 50 configurations are possible to achieve the web deforming and torsional force resisting functions of the present invention.

In use, the system 20 of the present invention positions and retains the fastener 22 between two generally parallel or spaced apart webs 24 extending from the first workpiece 26. The webs 24 are employed in the system 20 for attaching the fastener 22 to minimize or prevent shrink voids which might otherwise be formed on a cosmetic face 68 of the first workpiece 26. It is important to avoid or eliminate the shrink voids in applications where the cosmetic face 68 is observable and such shrink voids would constitute a cosmetic defect on the cosmetic face 68.

By way of example, the system 20 of the present invention, fastener 22, and method of the present invention could be employed to attach fasteners 22 to a mounting side 70 of a automobile grill assembly. Such an automobile grill assembly has a cosmetic face 68 with a cosmetic finish, such as chrome plating, which requires minimization or elimination of shrink voids. Once the fastener 22 is attached to the mounting side 70, the protrusion 32 extending from the mounting side 70 is attached to an appropriate portion of the vehicle to secure the grill thereto.

In using the system 20 of the present invention, the fastener 22 is positioned with the protrusion 32 extending into a cooperatively formed bore 72 in the ultrasonic horn 28. The web engaging head 30 is retained in the cavity 60 of the ultrasonic horn 28 for insertion between the webs 24,24. The ultrasonic horn 28 and fastener 22 are positioned with the web engaging head 30 in alignment with an opening or gap 74 between the webs 24 for ultrasonic insertion between the inside surfaces 56,56 of the webs 24,24. As the horn and fastener 28,22 are moved into position relative to the webs 24,24, the angled segments 53 of the system 20 plastically deform the outside surfaces 54 of the webs 24 inwardly to form crimped areas 55 which intimately engage the inside surfaces 56 of the webs 24 with the web engaging head 30. Ultrasonic energy is applied to the fastener 22 and transferred to the webs 24 by way of the ultrasonic horn 28 which is attached to an appropriate ultrasonic generating device of known construction. With the fastener 22 inserted between the webs 24,24, the axial force resisting portion 34 and torsional force resisting portion 36 resist axial pullout and rotary motion of the fastener 22 relative to the webs 24,24.

The method of the present invention includes positioning the fastener 22 proximate to the two generally parallel webs 24 for insertion therebetween. The ultrasonic horn 28 is activated to transmit ultrasonic energy from the horn 28 and through the fastener 22 to ultrasonically deform the material in the webs 24 around and into intimate engagement with the web engaging head 30 of the fastener 22. While the ultrasonic energy is transmitted to the fastener 22, a downward driving force is provided to position the fastener 22 between the webs 24,24. If the distance between the inside surfaces 56,56 of the webs 24,24 is less than an outside dimension of the web engaging head 30, the ultrasonic energy transmitted from the ultrasonic horn 28 through the fastener 22 will deform the material so that the head 30 may be inserted between the inside surfaces 56,56 of the webs 24,24. During the insertion operation, the material of the webs 24,24 is deformed and flows into the axial force resisting portion 34 as well as the torsional force resisting portion 36.

The present invention further includes a novel article 76 employing the novel system 20 of the present invention. The article 76 includes at least the two protruding portions or webs 24,24 extending from the mounting side 70 of the first workpiece 26 and at least one fastener 22 positioned and retained between the webs 24,24. The resultant article 76 presents the boss 32 of the fastener 22 extending from the mounting side 70 of the workpiece 26 for attachment to a second workpiece. The article 76 is securely attached to a second workpiece and prevents shrink voids on the cosmetic face 68 of the article. Additionally, the article 76 can be produced at reduced cost since complex slider or shuttle assemblies are not needed in the mold since a bridging structure on the mounting side of the article (discussed hereinabove in the Background section) is eliminated.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed Is:

1. An ultrasonic fastener insertion system for inserting and retaining a fastener in engagement with two generally parallel, spaced apart webs projecting from a first workpiece, said system preventing axial pull-out and rotation of said fastener relative to said first workpiece, said ultrasonic fastener insertion system comprising:

means for resisting axial forces disposed on said fastener to prevent said fastener from being axially pulled-out of said first workpiece;

means for resisting torsional forces disposed on said fastener to prevent said fastener from being rotated relative to said first workpiece;

means for engaging said fastener with a second workpiece to cooperatively associate said first and second workpieces;
means for ultrasonically engaging said fastener with said generally parallel webs of said first workpiece, a portion of at least one of said webs being plastically deformed by said ultrasonic means into intimate engagement with said axial force resisting means and said torsional force resisting means.

2. A fastener for ultrasonic insertion between two generally parallel, spaced apart webs of plastic material of a first workpiece, said fastener intimately engaging said webs upon application of ultrasonic energy thereto for resisting axial and torsional forces to prevent loosening or removal of said fastener from said webs, said fastener comprising:
a protrusion for engagement with a second workpiece;
a web engaging head on said fastener spaced apart from said protrusion, said web engaging head intimately engaging inside surfaces of at least one of said webs upon application of ultrasonic energy thereto, said web engaging head resisting at least axial forces applied to said fastener to resist pull-out from said webs of said first workpiece; and
a collar portion disposed on said web engaging head, said collar portion extending radially from said fastener for overlying and engaging at least one of said webs for resisting at least torsional forces applied to said fastener to prevent rotation of said fastener relative to said webs.

3. A fastener as recited in claim 2, wherein said collar is formed with at least one angled segment, said angled segment overlying a corresponding one of said webs.

4. A fastener as recited in claim 2, further including two angled segments on said collar at spaced apart locations for overlying and engaging corresponding ones of said two generally parallel, spaced apart webs.

5. A fastener having an integral material deforming portion for ultrasonic insertion between and intimate engagement with two spaced apart portions of a first workpiece, said fastener comprising:
a protrusion for attaching a second workpiece to said first workpiece;
a workpiece engaging head on said fastener spaced apart from said protrusion for engagement with said spaced apart portions on said workpiece, said workpiece engaging head resisting at least torsional forces to prevent torsional rotation of said fastener in said workpiece; and
said material deforming portion being positioned between said protrusion and said workpiece engaging head, said material deforming portion having a collar portion disposed on said fastener between said protrusion and said workpiece engaging head including a pair of angled segments, said angled segments being radially spaced apart on said collar for overlying and engaging a corresponding one of said spaced apart portions on said workpiece and for resisting at least torsional forces applied to said fastener to prevent rotation of said fastener relative to said spaced apart portions, said angled segments being angled for deforming and directing said spaced apart portions inwardly towards said workpiece engaging head upon application of ultrasonic forces thereto.

6. An article having at least two generally parallel, spaced apart webs of material and a fastener retained therebetween for mounting said article to a workpiece, said fastener being configured to resist axial pull-out and rotation relative to said webs, said fastener intimately engaging inside facing surfaces of said webs upon application of ultrasonic energy thereto for resisting axial and torsional forces to prevent loosening or removal of said fastener relative to said webs, said article comprising:
means for resisting axial forces disposed on said fastener to prevent said fastener from being axially pulled-out from engagement with said webs;
means for resisting torsional forces disposed on said fastener to prevent said fastener from being rotated relative to said webs;
means for engaging said fastener with said workpiece to cooperatively associate said article and workpieces;
means for ultrasonically engaging said fastener with said webs, a portion of at least one of said webs being plastically deformed by said ultrasonic means for intimately engaging said axial force resisting means and said torsional force resisting means.

7. An article as recited in claim 6, wherein said means for resisting axial forces disposed on said fastener further comprising:
a web engaging head on said fastener positionable between said webs, said web engaging head intimately engaging inside surfaces of at least one of said webs upon application of ultrasonic energy thereto to deform material of said web into intimate engagement with said web engaging head, said web engaging head resisting at least axial forces applied to said fastener to resist pull-out from said webs.

8. An article as recited in claim 6, wherein said means for resisting torsional forces disposed on said fastener further comprising:
a collar portion positioned proximate to said means for resisting axial forces, said collar portion extending radially from said fastener for overlying and engaging at least one of said webs upon application of ultrasonic energy thereto for resisting at least torsional forces applied to said fastener to prevent rotation of said fastener relative to said webs.

9. An article as recited in claim 6, wherein said means for engaging said fastener with said workpiece further comprising:
a protrusion disposed on said fastener proximate said means for resisting torsional forces and distal said means for resisting axial forces, said protrusion being formed for cooperatively engaging said workpiece from which said protrusion extends with a second workpiece.

10. An article as recited in claim 6, said means for ultrasonically engaging said fastener with said webs further comprising:
means for generating ultrasonic energy; and
at least one angled segment operatively associated with said article and said means for generating ultrasonic energy for transmitting ultrasonic energy to deform a portion of at least one web inwardly into intimate engagement with said fastener.

11. An article as recited in claim 10, wherein said fastener further comprising:
a collar disposed on said fastener proximate said means for resisting axial forces, said collar extending radially from said fastener for overlying and engaging at least one of said webs, said angled segment being defined by an angled portion of said collar, said angled segment on said collar resisting at least torsional forces applied to said fastener to prevent rotation of said fastener of said article relative to said webs of said article, said angled segment of said collar portion deforming said webs inwardly towards said material engaging head upon application of ultrasonic energy to said fastener.

12. An article as recited in claim 11, further comprising:

a pair of angled segments disposed on said collar, said angled segments being radially spaced apart on said collar and overlying corresponding ones of said webs, said angled segments being angled for deforming and directing said webs inwardly upon application of ultrasonic forces to said fastener.

13. An article as recited in claim 10, further comprising:

an ultrasonic horn having a frustoconical shaped interior cavity, an open end of said cavity defining a mouth, walls of frustoconical shaped cavity being angled inwardly away from said mouth and defining said angled segment, said means for generating ultrasonic energy being coupled to said ultrasonic horn, said fastener being engaged by said ultrasonic horn for inserting said fastener between said two generally parallel webs of material, said webs of material being deformed inwardly around said fastener by said angled segment of said ultrasonic horn.

14. An ultrasonic horn for use with a fastener for securing said fastener between two generally parallel webs of material, said ultrasonic horn having a frustoconical shaped interior cavity, an open end of said cavity defining a mouth, walls of said frustoconical shaped cavity being angled inwardly away from said mouth, said ultrasonic horn engaging a fastener for inserting said fastener between said two generally parallel webs of material, said webs of material being deformed inwardly for intimate engagement with said fastener by said sloping walls of said ultrasonic horn upon application of ultrasonic energy thereto.

15. A method of ultrasonically securing a fastener between two spaced apart portions of plastic material for preventing pull-out and rotation of said fastener retained between said spaced apart portions, said method employing an ultrasonic energy director associated with said fastener, said ultrasonic energy director including angled segments, said angled segments angling inwardly towards a central axis of said fastener, said method comprising the steps of:

positioning a fastener proximate to two generally parallel bodies of plastic material;

engaging an ultrasonic horn with said fastener;

transmitting ultrasonic energy from said ultrasonic horn to said ultrasonic energy director;

applying a driving force to said fastener under the influence of said ultrasonic horn for inserting said fastener into said plastic material of said spaced apart portions;

deforming said spaced apart portions inwardly around said fastener under the inwardly directing influence of said angled segments during the application of ultrasonic energy transmitted through said ultrasonic horn.

* * * * *